US009823766B2

(12) United States Patent
Li et al.

(10) Patent No.: US 9,823,766 B2
(45) Date of Patent: Nov. 21, 2017

(54) ARRAY SUBSTRATE AND DISPLAY DEVICE

(71) Applicants: Shanghai Tianma Micro-Electronics Co., Ltd., Shanghai (CN); Tianma Micro-Electronics Co., Ltd., Shenzhen (CN)

(72) Inventors: Gujun Li, Shanghai (CN); Yungang Sun, Shanghai (CN); Kang Yang, Shanghai (CN); Huijun Jin, Shanghai (CN)

(73) Assignees: SHANGHAI TIANMA MICRO-ELECTRONICS CO., LTD., Shanghai (CN); TIANMO MICRO-ELECTRONICS CO., LTD., Shenzhen (CN)

( * ) Notice: Subject to any disclaimer, the term of this patent is extended or adjusted under 35 U.S.C. 154(b) by 10 days.

(21) Appl. No.: 14/981,875

(22) Filed: Dec. 28, 2015

(65) Prior Publication Data

US 2016/0291755 A1 Oct. 6, 2016

(30) Foreign Application Priority Data

Apr. 1, 2015 (CN) .......................... 2015 1 0152987

(51) Int. Cl.
*G06F 3/044* (2006.01)
*G06F 3/041* (2006.01)
(Continued)

(52) U.S. Cl.
CPC ........ *G06F 3/0412* (2013.01); *G02F 1/13338* (2013.01); *G02F 1/134309* (2013.01); *G06F 3/044* (2013.01); *G02F 2001/134372* (2013.01)

(58) Field of Classification Search
CPC ...................................................... G06F 3/044
See application file for complete search history.

(56) References Cited

U.S. PATENT DOCUMENTS

| 2013/0033439 A1* | 2/2013 | Kim .................... G02F 1/13338 345/173 |
| 2014/0085582 A1* | 3/2014 | Chang ............... G02F 1/134363 349/138 |

(Continued)

FOREIGN PATENT DOCUMENTS

| CN | 102914893 A | 2/2013 |
| JP | 2014021865 A | 2/2014 |

OTHER PUBLICATIONS

Chinese Application No. 201510152987.3, First Office Action dated Feb. 15, 2017.

*Primary Examiner* — Olga Merkoulova
(74) *Attorney, Agent, or Firm* — Alston & Bird LLP

(57) ABSTRACT

It is provided an array substrate and a display device. The array substrate includes a first substrate. Multiple first common electrodes and multiple second common electrodes are arranged above the first substrate, where the first and second common electrodes are configured to serve as common electrodes in a display phase and serve as touch sensing electrodes in a touch sensing phase. The first common electrodes are arranged in a different film layer from the second common electrodes, and projections of first common electrodes on the first substrate are adjacent to or overlap with projections of second common electrodes adjacent to the first common electrodes on the first substrate in a first direction.

17 Claims, 6 Drawing Sheets

(51) Int. Cl.
G02F 1/1333 (2006.01)
G02F 1/1343 (2006.01)

(56) References Cited

U.S. PATENT DOCUMENTS

2014/0333582 A1* 11/2014 Huo .................... G02F 1/13338
 345/174
2015/0092025 A1* 4/2015 Chang ................ H04N 13/0409
 348/54

* cited by examiner

ARRAY SUBSTRATE AND DISPLAY DEVICE

CROSS REFERENCE OF RELATED APPLICATION

The present application claims the priority to Chinese Patent Application No. 201510152987.3, entitled "ARRAY SUBSTRATE AND DISPLAY DEVICE", filed on Apr. 1, 2015 with the State Intellectual Property Office of People's Republic of China, which is incorporated herein by reference in its entirety.

FIELD OF THE INVENTION

The present disclosure relates to the technical field of display, and in particular, to an array substrate and a display device.

BACKGROUND OF THE INVENTION

At present, a touch screen as an input medium is one of simplest, most convenient and natural ways for human-computer interaction. Integrating a touch function into a Liquid Crystal Display (LCD) or Organic Light-Emitting Diode (OLED) display has becoming a research focus to more and more flat panel display manufactures.

In order to further reduce the volume of a touch screen to reduce the size of a mobile terminal with the touch screen, an in cell Touch display Panel (in cell TP) has been developed in the field of display technology in recent years. In the in cell TP, a touch electrode is integrated into a liquid crystal cell. Therefore, a touch screen in which the in cell TP is adopted may have a smaller size than a touch screen in which a One Glass Solution (OGS) is adopted.

Reference is made to FIG. 1, which is a schematic diagram of an in cell TP in related art. A common electrode is arranged above an array substrate 10 of a liquid crystal display panel, for providing a common potential to a pixel unit (not shown). In order to integrate a touch function into the liquid crystal display panel, the common electrode is divided into multiple touch electrode units 12 which are independent from each other, and each touch electrode unit 12 is connected to a touch display chip 11 arranged above the array substrate 10 through a touch electrode lead 13. The working time of the liquid crystal display panel includes a display phase and a touch sensing phase. In the display phase, the touch display chip 11 transmits a touch sensing signal to each touch electrode unit 12; and in the touch sensing phase, the touch display chip 11 transmits a same common signal to all touch electrode units 12.

Reference is made to FIG. 1 again. In the in cell TP, since the touch electrode unit 12 is used to provide the common signal to the pixel unit to display an image, a space between adjacent touch electrode units 12 is generally arranged in a non-display region outside the pixel units. A data line 15 is arranged in a non-display region between adjacent touch electrode units 12 in a horizontal direction (a direction as shown by line AA').

FIG. 2 is a cross-sectional view along a line BB' in FIG. 1. A pixel electrode 14 of the pixel unit is arranged below the touch electrode unit 12. An edge electric field is formed between the touch electrode unit 12 and the pixel electrode 14, and drives liquid crystal molecules to rotate. That is to say, the array substrate shown in FIGS. 1 and 2 is an array substrate of a liquid crystal display panel in a Fringe Field Switching (FFS) mode. Referring to FIGS. 1 and 2, the space between adjacent touch electrode units 12 in the horizontal direction (the direction as shown by line AA') is above the data line 15. When the data line 15 is loaded with a drive potential, a lateral electric field may be generated between the data line 15 and a touch electrode unit 12 loaded with a common potential, so that liquid crystal molecules in a non-display region corresponding to the data line 15 rotate, and a light leakage occurs in pixel units on two sides of the non-display region. In order to reduce the light leakage, in the conventional art, a touch electrode lead 13 is generally arranged above the data line 15 to shield the lateral electric field between the data line 15 and the touch electrode unit 12. However, the light leakage still exists since a position deviation is prone to occur between the touch electrode unit 13 and the touch electrode unit 12 during the manufacture.

BRIEF SUMMARY OF THE INVENTION

An array substrate and a display device in the disclosure are provided, to reduce the light leakage of a display panel integrated with a touch function.

In order to address the above issues, an array substrate is provided in the disclosure, which include:
a first substrate;
a pixel unit array arranged on the first substrate, wherein the pixel unit array includes multiple pixel units arranged in an array;
multiple scan lines arranged in a first direction and multiple data lines arranged in a second direction, where the scan lines and the data lines are configured to drive the pixel units;
multiple first common electrodes and multiple second common electrodes, where the common electrodes are configured to serve as common electrodes in a display phase and serve as touch sensing electrodes in a touch sensing phase,
where the first common electrodes are arranged in a different film layer from the second common electrodes; and
in the first direction, projections of the first and second common electrodes on the first substrate are arranged alternately, and projections of the first and second common electrodes on the first substrate are arranged adjacent to or overlap with each other; or multiple first common electrodes are arranged in turn in the first direction to form first common electrode groups, multiple second common electrodes are arranged in turn in the first direction to form second common electrode groups, projections of the first and second common electrode groups on the first substrate are arranged alternately in the first direction, and a projection of a first common electrode on the first substrate is adjacent to or overlaps with a projection of a second common electrode adjacent to the first common electrode on the first substrate in the first direction.

As compared with the conventional technologies, the technical solution of the present disclosure has advantages as follows: the first common electrodes are arranged in a different film layer from the second common electrodes. In the first direction, projections of first common electrodes on the substrate are adjacent to or overlap with projections of second common electrodes adjacent to the first common electrodes on the substrate. A space between first and second common electrodes is not arranged above the data line extending in the second direction, and no lateral electric field is generated between the data line and the first or second common electrode. Therefore, the light leakage caused by the electric field of the data line is reduced effectively.

DETAILED DESCRIPTION OF THE INVENTION

Figure 1:
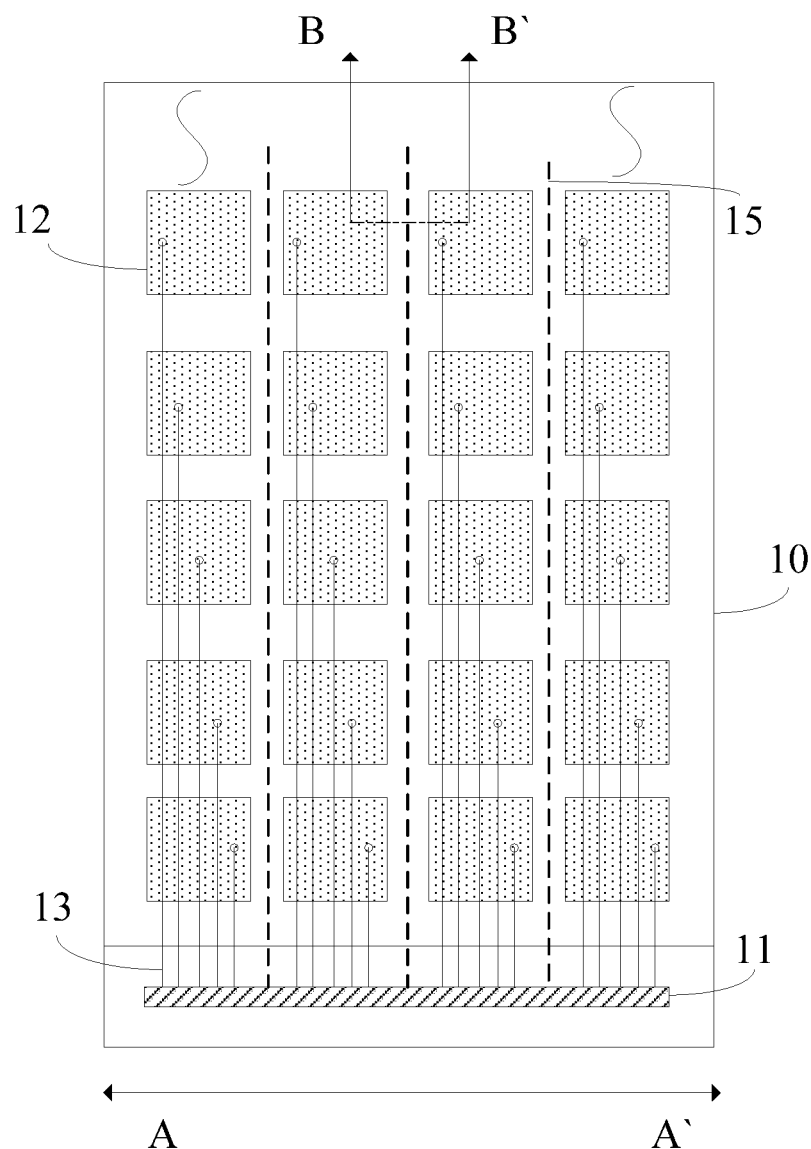
FIG. 1 is a schematic diagram of a touch display panel in the related art.
Figure 2:
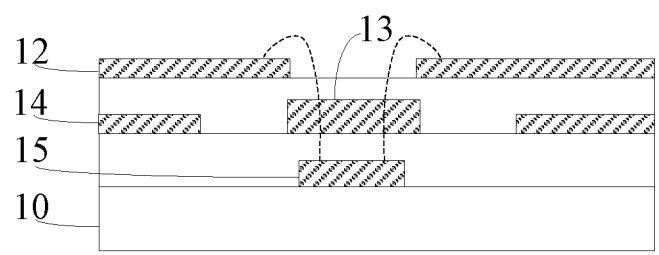
FIG. 2 is a schematic diagram of a principle that a light leakage occurs in the touch display panel shown in FIG. 1.

As described in the background, in an in cell TP according to the conventional technologies, the space between adjacent touch electrode units in a horizontal direction of an array substrate is arranged above a data line. When the data line is loaded with a drive potential, a lateral electric field is generated between the data line and a touch electrode unit loaded with a common potential, so that liquid crystal molecules in a liquid crystal layer above the space rotate, and a light leakage occurs in pixel units on two sides of a non-display region.

In order to address the above technical issues, it is provided an array substrate in the disclosure, which include:

a first substrate;

a pixel unit array arranged on the first substrate, wherein the pixel unit array includes multiple pixel units arranged in an array;

multiple scan lines arranged in a first direction and multiple data lines arranged in a second direction, where the scan lines and the data lines are configured to drive the pixel units;

multiple first common electrodes and multiple second common electrodes, where the common electrodes are configured to serve as common electrodes in a display phase and serve as touch sensing electrodes in a touch sensing phase, where the first common electrodes are arranged in a different film layer from the second common electrodes; and in the first direction, projections of the first and second common electrodes on the first substrate are arranged alternately, and projections of the first and second common electrodes on the first substrate are arranged adjacent to or overlap with each other; or multiple first common electrodes are arranged in turn in the first direction to form first common electrode groups, multiple second common electrodes are arranged in turn in the first direction to form second common electrode groups, projections of the first and second common electrode groups on the first substrate are arranged alternately in the first direction, and a projection of a first common electrode on the first substrate is adjacent to or overlap with a projection of a second common electrode adjacent to the first common electrode on the first substrate in the first direction.

The first common electrodes are arranged in a different film layer from the second common electrodes. In the first direction, projections of first common electrodes on the substrate are adjacent to or overlap with projections of second common electrodes adjacent to the first common electrodes on the substrate. A space between the first and second common electrodes is not arranged above the data line extending in the second direction, and no lateral electric field is generated between the data line and the first or second common electrode. Therefore, the light leakage caused by the electric field of the data line is reduced effectively.

In the following, embodiments of the present disclosure are described in detail in conjunction with the drawings, so that the above objects, features and advantages of the present disclosure become more apparent.

Figure 3:
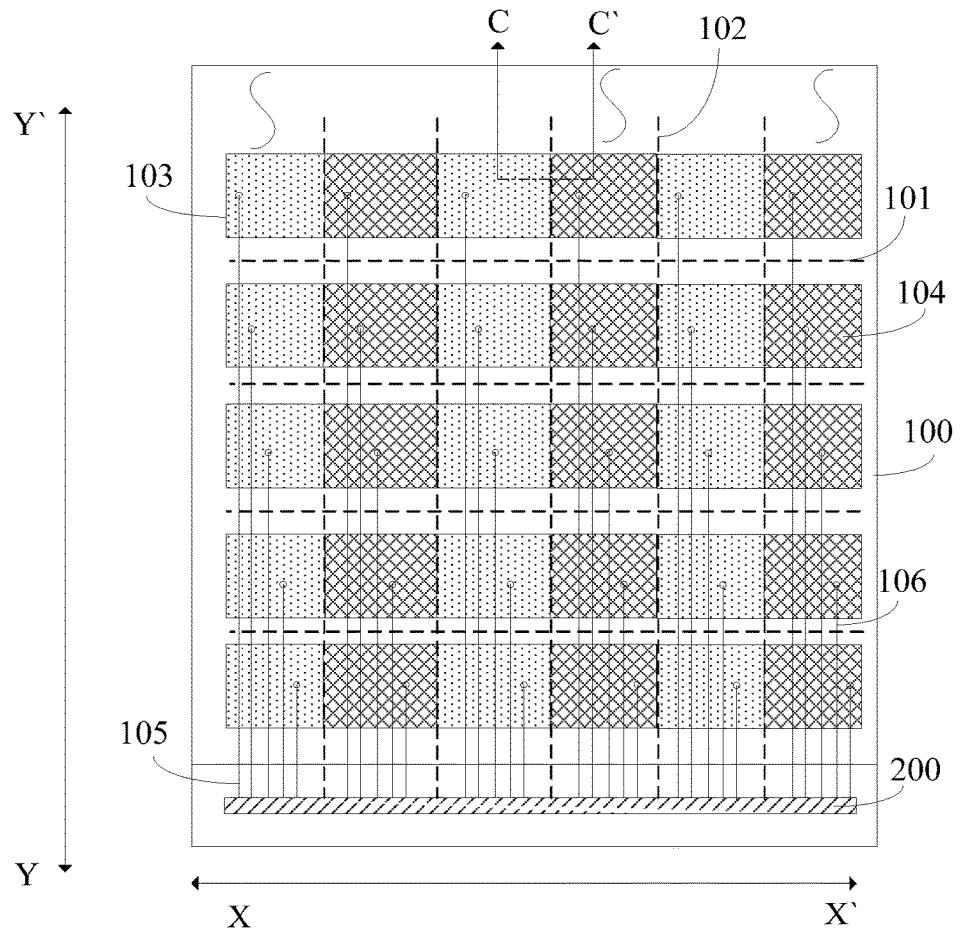
FIG. 3 is a schematic diagram of an array substrate according to the present disclosure.

Reference is made to FIG. 3, which is a schematic diagram of an array substrate according to the present disclosure. The array substrate according to an embodiment includes: a first substrate 100, a pixel array arranged on the first substrate 100, multiple scan lines 101 extending in a first direction (a direction shown by line XX' in FIG. 3), multiple data lines 102 extending in a second direction (a direction shown by line YY' in FIG. 3), and multiple first common electrodes 103 and multiple second common electrodes 104.

The first substrate 100 is a glass substrate in an embodiment, and the first substrate 100 is not limited thereto in the present disclosure.

The pixel array includes multiple pixel units (not shown) arranged in an array. It should be noted that the pixel unit includes structures (not shown), such as a pixel electrode and a thin-film transistor, including a gate electrode, a source electrode and a drain electrode.

The scan lines 101 and the data lines 102 are used for driving the pixel unit. It should be noted that only a portion of the scan lines 101 and the data lines 102 are shown in FIG. 3.

The first common electrodes 103 and the second common electrodes 104 are configured to serve as common electrodes in a display phase and serve as touch sensing electrodes in a touch sensing phase. The first common electrodes 103 are arranged in a different film layer from the second common electrodes 104.

It should be noted that, in an embodiment, the pixel unit array includes multiple first pixel unit combinations (not shown) and multiple second pixel unit combinations (not shown). Each of the first and second pixel unit combinations includes multiple pixel units. Each first pixel unit combination corresponds to the first common electrode 103 in a direction perpendicular to the first substrate 100, and each second pixel unit combination corresponds to the second common electrode 104 in the direction perpendicular to the first substrate 100.

In an embodiment, projections of the first common electrodes 103 on the first substrate 100 and projections of the second common electrodes 104 on the first substrate 100 are arranged alternately in the first direction, and are adjacent to each other in the first direction. It should be noted that, in an embodiment, projections of the first common electrodes 103 on the first substrate 100 and projections of the second common electrodes 104 on the first substrate 100 are not arranged alternately in the second direction. Multiple first common electrodes 103 are arranged in turn in the second direction to form third common electrode groups, and multiple second common electrodes 104 are arranged in turn in the second direction to form fourth common electrode groups. Projections of the third and fourth common electrode groups on the first substrate 100 are arranged alternately in the first direction.

In an embodiment, a touch display chip 200 is further arranged above the first substrate 100. The touch display chip 200 is connected to each of the data lines 102, to provide display signals to the data lines 102.

Figure 4:
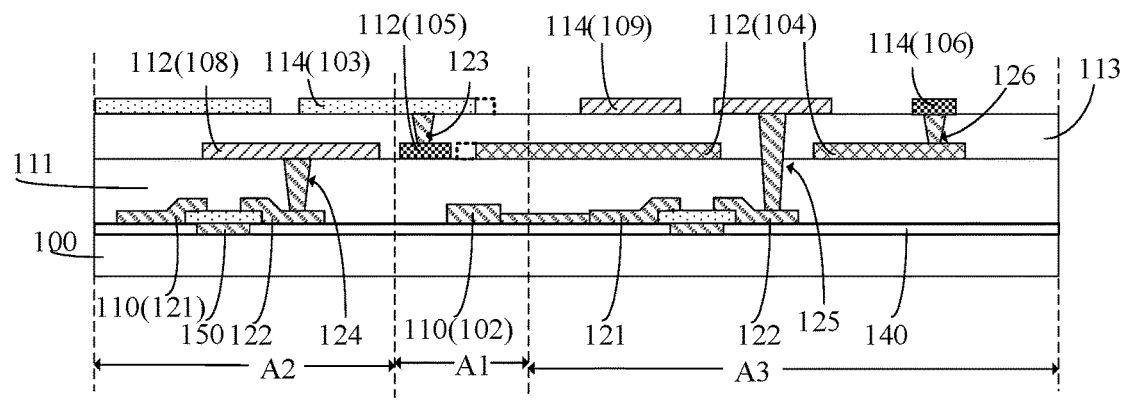
FIG. 4 is a cross-sectional view of the array substrate shown in FIG. 3.

FIG. 4 is a cross sectional view of the array substrate shown in FIG. 3. It should be noted that, to illustrate a positional relationship between different film layers clearly, FIG. 4 is divided into three parts. A first part A1 is a cross-sectional view along a line CC' in FIG. 3. The section position along the line CC' is at a place in which the first common electrode 103 is adjacent to the second common electrode 104 in the first direction. A second part A2 is a schematic structural diagram of a pixel unit in the first pixel unit combination in FIG. 3. And a third part A3 is a schematic structural diagram of a pixel unit in the second pixel unit combination in FIG. 3.

Referring to FIGS. 4 and 3, a first conductive layer 110, a first insulating layer 111, a second conductive layer 112, a second insulating layer 113 and a third conductive layer 114 are arranged in turn above the first substrate 100. The array substrate is an array substrate in the FFS display mode in an embodiment, and the array substrate is not limited thereto in the disclosure.

Multiple drain electrodes 122, multiple source electrodes 121 and the data lines 102 are arranged in the first conductive layer 110. It should be noted that, in an embodiment, a metal bottom layer 140 is further arranged between the first conductive layer 110 and the first substrate 100. Each of the multiple pixel units includes a drain electrode 122, a source electrode 121, a gate electrode 150 and a scan line 101 (not shown in FIG. 4) arranged in the metal bottom layer 140. The gate electrode 150 is connected to the scan line arranged in the metal bottom layer. The gate electrode 150, the drain electrode 122 and the source electrode 121 form a thin-film transistor for turning on or off the pixel unit. It should be noted that, in FIG. 4, a structure including only two pixel units is shown, and accordingly, only two drain electrodes 121 and two source electrodes 122 are shown.

Referring to the second part A2 in FIG. 4, in an embodiment, each pixel unit in the first pixel unit combination includes a first pixel electrode 108 arranged in the second conductive layer 112, and all pixel units in the first pixel unit combination share a first common electrode 103 arranged in the third conductive layer 114.

Referring to the third part A3 in FIG. 4, in an embodiment, each pixel unit in the second pixel unit combination includes a second pixel electrode 109 arranged in the third conductive layer 114, and all pixel units in the second pixel unit combination share a second common electrode 104 arranged in the second conductive layer 112.

Referring to the first part A1 in FIG. 4, in an embodiment, at a place in which the first common electrode 103 is adjacent to the second common electrode 104 in the first direction, the projection of the first common electrode 103 on the first substrate 100 is adjacent to the projection of the first common electrode 104 on the first substrate 100 in the first direction, which is not limited thereto in the disclosure. In other embodiments, as shown by dashed boxes extending respectively from the first common electrode 103 and the second common electrode 104, the projection of the first common electrode 103 on the first substrate 100 may overlap with the projection of the second common electrode 104 on the first substrate 100 in the first direction.

Referring to FIGS. 3 and 4, the place in which the first common electrode 103 is adjacent to the second common electrode 104 is in a non-display region outside a pixel unit, and a portion of the data lines 102 are arranged below the place in which the first common electrode 103 is adjacent to the second common electrode 104. The first common electrodes 103 are arranged in a different film layer from the second common electrodes 104. A projection of a first common electrode on the substrate is adjacent to a projection of a second common electrode adjacent to the first common electrode on the substrate in the first direction. The space between the first common electrode 103 and the second common electrode 104 is not arranged above the data line 102 extending in the second direction. No lateral electric field is generated between the data line 102 and the first common electrode 103 or second common electrode 104. Therefore, a light leakage caused by an electric field of the data line 102 is reduced effectively.

Referring to FIGS. 3 and 4 again, in an embodiment, a touch sensing chip is further arranged above the first substrate 100. Specifically, the touch sensing chip is the touch display chip 200 for providing a touch signal to a touch electrode lead 107. That is to say, the touch display chip 200 can provide a display signal and a touch signal, which is not limited thereto in the disclosure. In other embodiments, two chips may also be arranged to respectively provide the display signal and the touch signal.

A first via hole 123 and a second via hole 126 are formed in and pass through the second insulating layer 113.

A first touch lead 105 is arranged in the second conductive layer 112, and a second touch lead 106 is arranged in the third conductive layer 114.

In an embodiment, each first common electrode 103 is connected to the first touch lead 105 through the first via hole 123, and separately serves as a touch sensing electrode. Each second common electrode 104 is connected to the second touch lead 106 through the second via hole 126, and separately serves as a touch sensing electrode.

The first touch lead 105 and the second touch lead 106 each are connected to the touch display chip 200.

The data lines 102 are arranged in the first conductive layer 110, and each data line 102 is connected to source electrodes 121 of a column of the pixel units.

A third via hole 124 is formed in and passes through the first insulating layer 111, and a fourth via hole 125 is formed in and passes through the first insulating layer 111 and the second insulating layer 113.

In a pixel unit in the first pixel unit combination, the first pixel unit 108 is connected to a drain electrode 122 of the pixel unit through the third via hole 124.

In a pixel unit in the second pixel unit combination, the second pixel unit 109 is connected to a drain electrode 122 of the pixel unit through the fourth via hole 125.

In an embodiment, since the first touch lead 105 is arranged in the second conductive layer 112 and the second touch lead 106 is arranged in the third conductive layer 114, it is unnecessary for the first touch lead 105 and the second touch lead 106 to occupy a new conductive layer, so that the structure of the array substrate is simpler and the fabrication process is simpler.

It should be noted that, in an embodiment, the first direction is perpendicular to the second direction, which is not limited thereto in the disclosure.

It should further be noted that, in an embodiment, the first common electrode 103 and the second common electrode 104 are made of transparent metal oxide.

Figure 5:
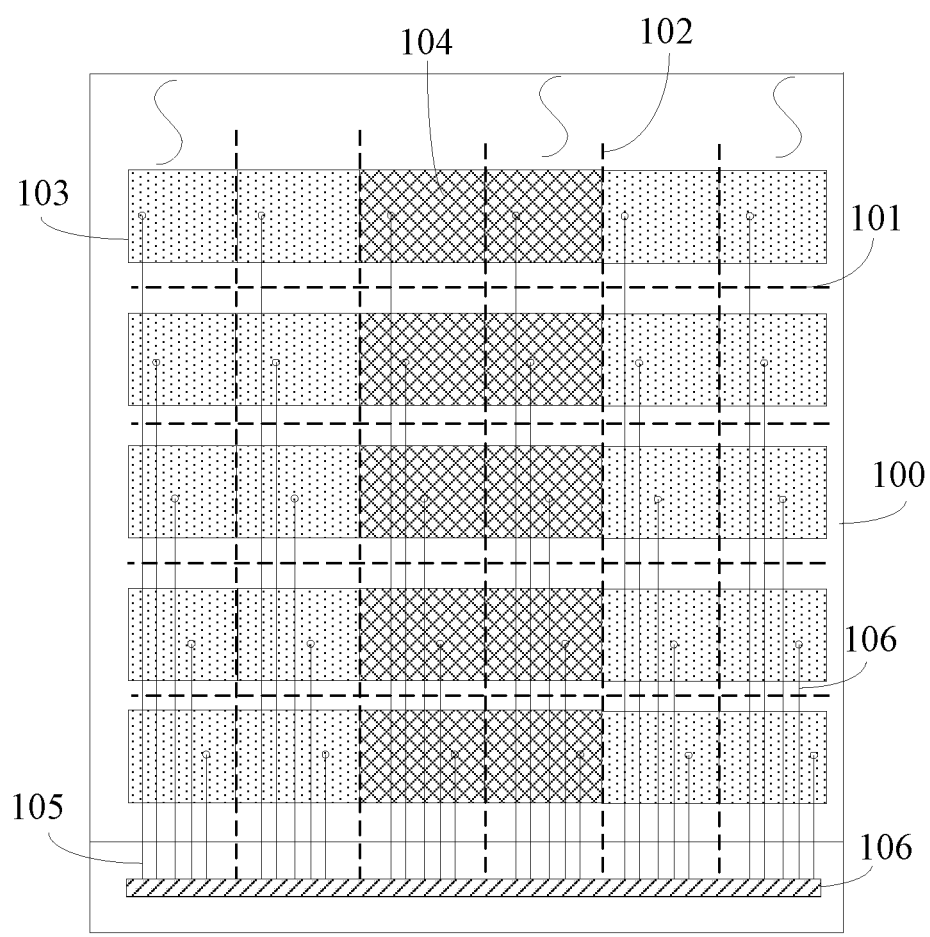
FIG. 5 is a schematic diagram of an array substrate according to the present disclosure.

Reference is made to FIG. 5, which is a schematic diagram of an array substrate according to the present disclosure. The array substrate according to this embodiment is approximately the same as the array substrate shown in FIG. 3, and portions of the array substrate which are the same as those shown in FIG. 3 will not be described herein. Differences between the array substrate according to this embodiment and the array substrate shown in FIG. 3 are as follows.

Multiple first common electrodes 103 are arranged in turn in the first direction to form first common electrode groups, and multiple second common electrodes 104 are arranged in turn in the first direction to form second common electrode groups. Projections of the first and second common electrode groups on the first substrate 100 are arranged alternately in the first direction, and a projection of a first common electrode 103 on the first substrate 100 is adjacent to or overlaps with a projection of a second common electrode 104 adjacent to the first common electrode 103 on the first substrate 100 in the first direction.

In an embodiment, the first common electrode group includes two first common electrodes 103 arranged in turn in the first direction, and the second common electrode group includes two second common electrodes 104 arranged in turn in the first direction. As shown in FIG. 5, at the place in which the first common electrode group is adjacent to the second common electrode group, the projection of the first common electrode 103 on the first substrate 100 is adjacent to or overlaps with the projection of the second common electrode 104 on the first substrate 100. No lateral electric field is generated between the first common electrode 103 or the second common electrode 104 and a data line 102 below the place in which the first common electrode group is adjacent to the second common electrode group. Hence, the light leakage caused by the data line 102 is reduced effectively.

Figure 6:
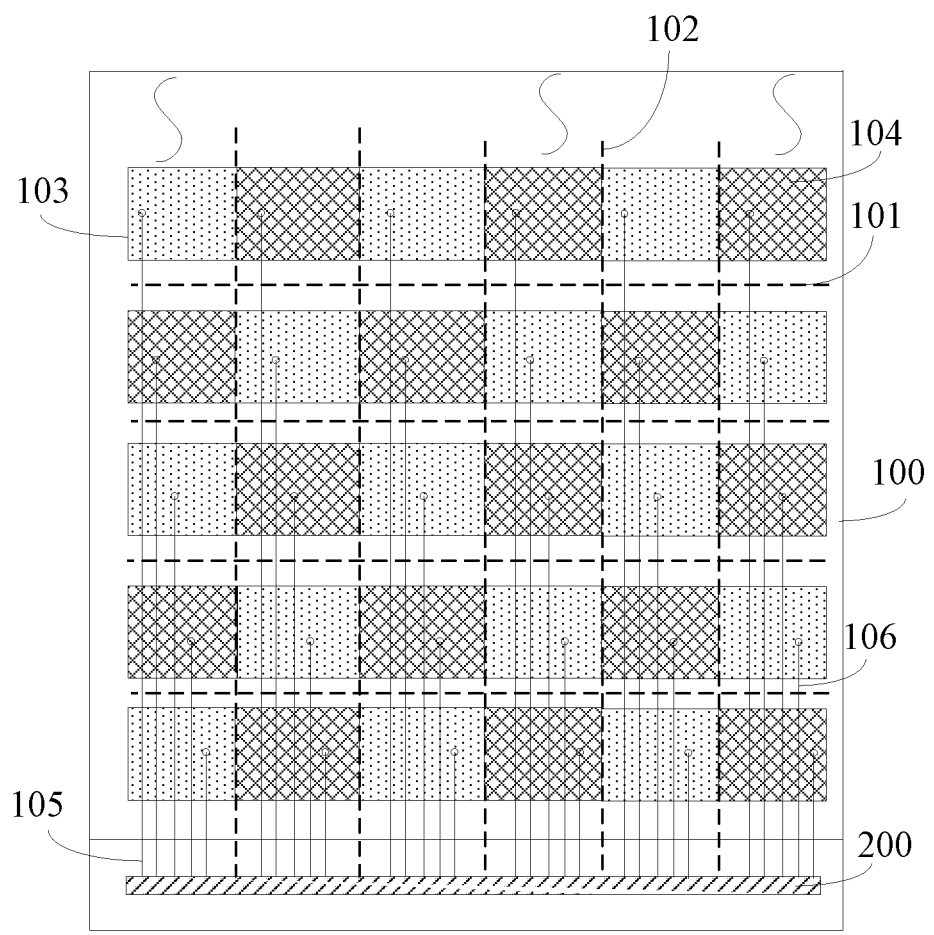
FIG. 6 is a schematic diagram of an array substrate according to the present disclosure.

Reference is made to FIG. 6, which is a schematic diagram of an array substrate according to the present disclosure. The array substrate is approximately the same as the array substrate shown in FIG. 3, and portions of the array substrate which are the same as those shown in FIG. 3 will not be described herein. Differences between the array substrate shown in FIG. 6 and the array substrate shown in FIG. 3 are as follows.

The first common electrodes 103 and the second common electrodes 104 are arranged in a chessboard shape above the first substrate 100. The first common electrodes 103 and the second common electrodes 104 are arranged alternately in the second direction. With the chessboard shape, the mutual effect between the first common electrode 103 and the second common electrode 104 is further reduced, which facilitates the improvement of the accuracy of touch sensing.

Figure 7:
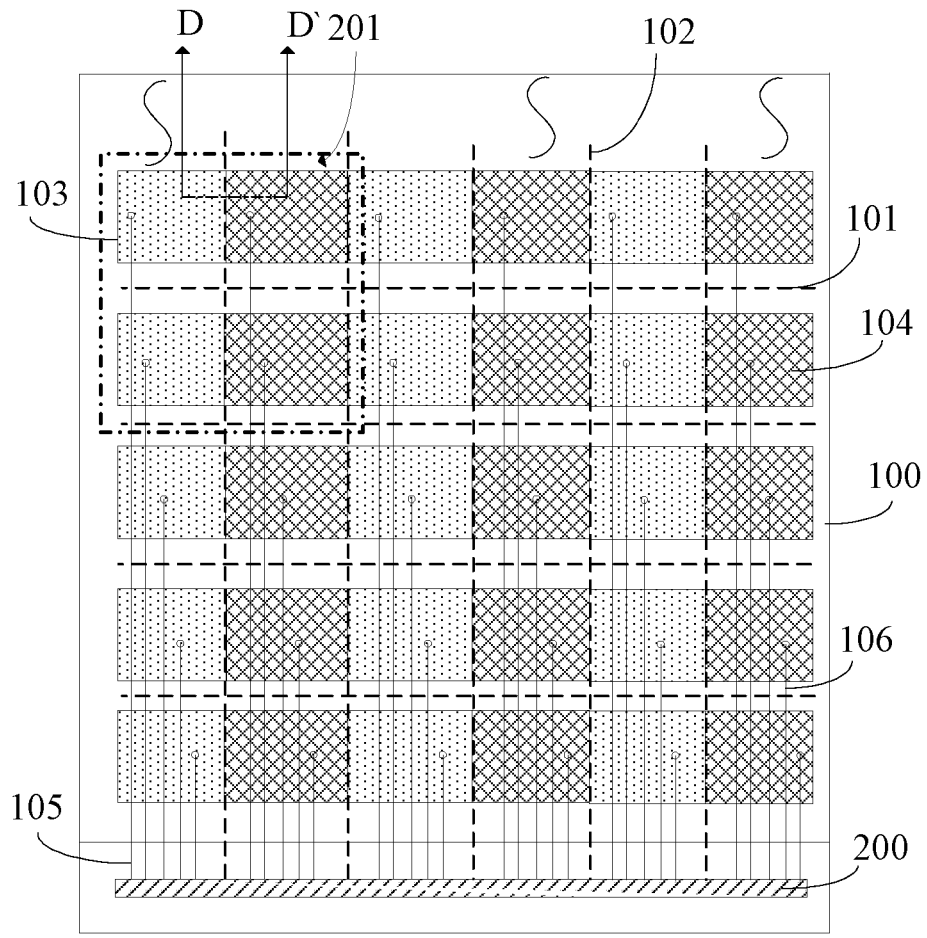
FIG. 7 is a schematic diagram of an array substrate according to the present disclosure.
Figure 8:
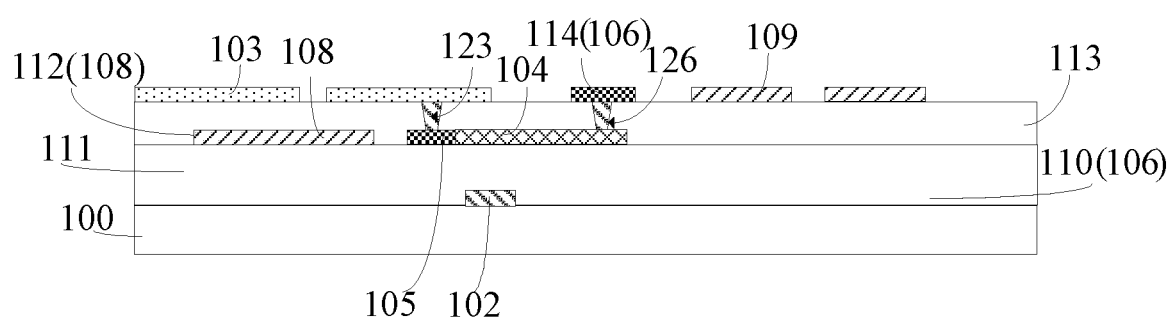
FIG. 8 is a cross-section view of the array substrate shown in FIG. 7 along a line DD'.

FIG. 7 is a schematic diagram of an array substrate according to the present disclosure, and FIG. 8 is a cross-sectional view along a line DD' in the array substrate shown in FIG. 7. Referring to FIGS. 7 and 8, the array substrate is approximately the same as the array substrate shown in FIG. 3, and portions of the array substrate which are the same as those shown in FIG. 3 will not be described herein. Differences between this array substrate and the array substrate shown in FIG. 3 are as follows.

In an embodiment, two first common electrodes 103 are connected to two second common electrodes 104 respectively adjacent to the two first common electrodes 103, to form common electrode units 201, and each common electrode unit 201 serves as a touch sensing electrode.

It should be noted that, the section position in FIG. 8 is on the common electrode unit 201 in FIG. 7. In FIG. 8, structures, such as a source electrode, a gate electrode and a drain electrode, are omitted from the pixel electrodes on two sides of a place in which the first common electrode 103 is adjacent to the second common electrode 104. Referring to FIGS. 7 and 8, in each common electrode unit 201, a second common electrode 104 is connected to a first touch lead 105 of a first common electrode 103 adjacent to the second common electrode 104, so that the first common electrode 103 is electrically connected to the second common electrode 104 in each common electrode unit 201.

In other embodiments, a first common electrode 103 may be electrically connected to a second common electrode 104 in each common electrode unit 201 by connecting the first common electrode 103 to a second touch lead 106 of the second common electrode 104 adjacent to the first common electrode 103, or connecting a second common electrode 104 to the first touch lead 105 of a first common electrode 103 adjacent to the second common electrode 104.

It should be noted that, FIG. 8 shows a connection manner between the first common electrode 103 and the second common electrode 104 in the common electrode unit 201 in the first direction, and a connection manner between the first common electrode 103 and the second common electrode 104 in the second direction is the same as the connection mode in the first direction.

Figure 9:
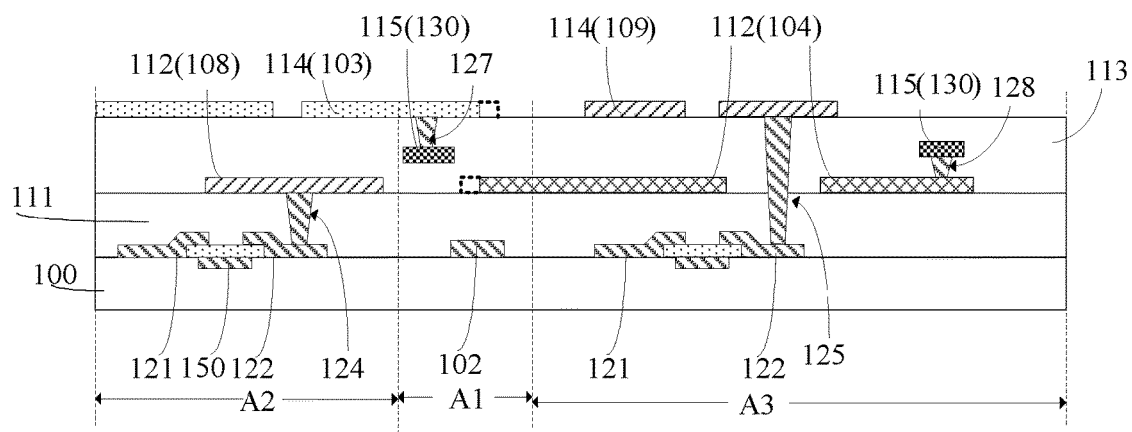
FIG. 9 is a cross-section view of an array substrate according to the present disclosure.

FIG. 9 shows a cross-sectional view of an array substrate according to the present disclosure. The array substrate is approximately the same as the array substrate shown in FIG. 3, and portions of the array substrate which are the same as those shown in FIG. 3 will not be described herein. Differences between this array substrate and the array substrate shown in FIG. 3 are as follows.

Referring to FIG. 9, in an embodiment, a fourth conductive layer 115 insulated from the second conductive layer 112 and the third conductive layer 114 is arranged in the second insulating layer 113. Multiple third touch leads 130 are arranged in the fourth conductive layer 115. A fifth via hole 128 through which the second conductive layer 112 and the fourth conductive layer 114 are conducted are formed in the second insulating layer 113, and a sixth via hole 127 through which the third conductive layer 114 and the fourth conductive layer 115 are conducted are formed in the second insulating layer 113. A portion of the third touch leads 130 are connected to the first common electrode 103 through the fifth via hole 128, and a portion of the third touch leads 130 are connected to the second common electrode 104 through the sixth via hole 127. The multiple third touch leads 103 are connected to the touch sensing chip (not shown in FIG. 9) to provide touch signals to the first common electrodes 103 and the second common electrodes 104.

In an embodiment, the third touch lead 130 is arranged in the fourth conductive layer 115 which is insulated from the second conductive layer 112 and the third conductive layer 114. When each third touch lead 130 is loaded with a touch signal, the effects on the first common electrodes 103 or second common electrodes 104 other than the first common electrode 103 and the second common electrode 104 which are connected to the third touch lead 130 are reduced, and the effects on first pixel electrodes 108 and second pixel electrodes 109 in adjacent pixel units are also reduced.

In an embodiment, each first common electrode 103 separately serves as a touch sensing electrode, and each second common electrode 104 separately serves as a touch sensing electrode.

Figure 10:
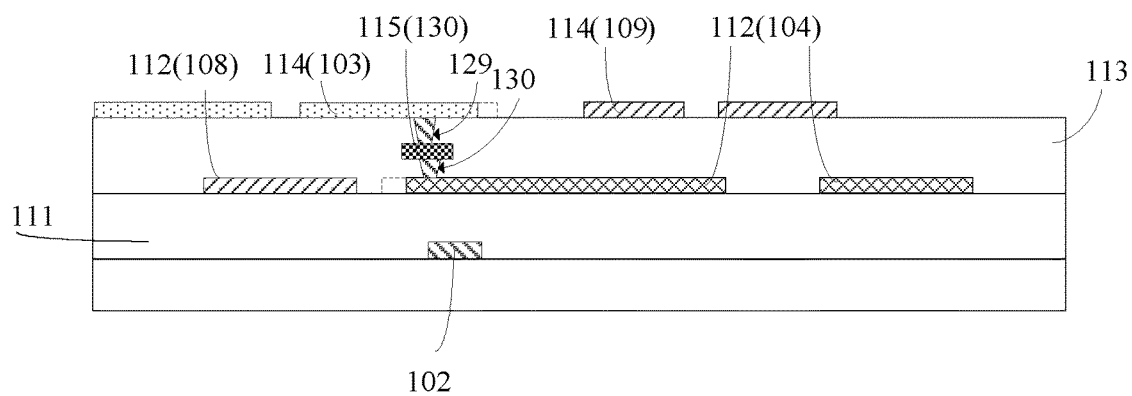
FIG. 10 is a cross-section view of an array substrate according to the present disclosure.

FIG. 10 shows a cross-sectional view of an array substrate according to the present disclosure. It should be noted that FIG. 10 shows a schematic structural diagram of a place in which the first common electrode 103 is adjacent to the second common electrode 104 in the first direction and omits structures such as a source electrode, a gate electrode and a drain electrode. Referring to FIG. 10, the array substrate according to this embodiment is approximately the same as the array substrate shown in FIG. 9, and portions of the array substrate which are the same as those shown in FIG. 9 will not be described herein. Differences between this array substrate and the array substrate shown in FIG. 9 are as follows.

Multiple first common electrodes 103 are connected to multiple second common electrodes 104 respectively adjacent to the multiple first common electrodes 103 to form common electrode units. Each common electrode unit serves as a touch sensing electrode. In each common electrode unit, a first common electrode 103 is electrically connected to a second common electrode 104 adjacent to the first common electrode 103 through the third touch lead 130.

It is further provided a display device in the disclosure, which include:
the array substrate according to the present disclosure; and
a cover plate arranged opposite to the array substrate.

In an embodiment, the cover plate is a color filter. And the display device further includes: a liquid crystal layer arranged between the array substrate and the color filter, and a touch sensing chip arranged on the array substrate.

With the array substrate according to the present disclosure, a light leakage caused by an electric field of data line between a first electrode unit and a second electrode unit adjacent to the first electrode unit is avoided. As compared with the conventional technologies, a better display effect is obtained with the display device according to the present disclosure.

The present disclosure is disclosed above, which is not limited thereto. Various alternations and modifications can be made to the technical solutions of the present disclosure by those skilled in the art without deviation from the spirit and scope of the present disclosure. Therefore, the scope of protection of the present disclosure is defined by the appended claims.

The invention claimed is:

1. An array substrate, comprising:
a first substrate;
a pixel unit array arranged on the first substrate, wherein the pixel unit array comprises a plurality of pixel units arranged in an array;
a plurality of scan lines arranged in a first direction and a plurality of data lines arranged in a second direction, wherein the plurality of scan lines and the plurality of data lines are configured to drive the plurality of pixel units;
a plurality of first common electrodes and a plurality of second common electrodes, wherein the plurality of first and second common electrodes are configured to serve as common electrodes in a display phase and serve as touch sensing electrodes in a touch sensing phase; and
a plurality of touch leads,
wherein the first common electrodes are arranged in a different film layer from the second common electrodes and the first and second common electrodes are connected to the plurality of touch leads;
projections of the first and second common electrodes on the first substrate are arranged alternately in the first direction, and projections of the first and second common electrodes on the first substrate are arranged adjacent to or overlap with each other in the first direction; or the plurality of the first common electrodes are arranged in turn in the first direction to form first common electrode groups, the plurality of the second common electrodes are arranged in turn in the first direction to form second common electrode groups, projections of the first and second common electrode groups on the first substrate are arranged alternately in the first direction, and a projection of a first common electrode on the first substrate is adjacent to or overlaps with a projection of a second common electrode adjacent to the first common electrode on the first substrate in the first direction.

2. The array substrate according to claim 1, wherein the projections of the first and second common electrodes on the first substrate are arranged alternately in the first direction, the first and second common electrodes are arranged in a chessboard shape above the first substrate, and the projections of the first and second common electrodes on the first substrate are arranged alternately in the second direction.

3. The array substrate according to claim 1, wherein the projections of the first and second common electrodes on the first substrate are arranged alternately in the first direction, a plurality of the first common electrodes are arranged in turn in the second direction to form third common electrode groups, a plurality of the second common electrodes are arranged in turn in the second direction to form fourth common electrode groups, and projections of the third and fourth common electrode groups on the first substrate are arranged alternately in the first direction.

4. The array substrate according to claim 1, wherein a first conductive layer, a first insulating layer, a second conductive layer, a second insulating layer and the third conductive layer are arranged in turn above the first substrate, and each of the plurality of pixel units comprises a source electrode and a drain electrode arranged in the first conductive layer.

5. The array substrate according to claim 4, wherein the pixel unit array comprises a plurality of first pixel unit combinations and a plurality of second pixel unit combinations, and each of the first and second pixel unit combinations comprises a plurality of pixel units;
each pixel unit in the first pixel unit combination comprises a first pixel unit electrode arranged in the second conductive layer, and all pixel units in the first pixel unit combination share a first common electrode arranged in the third conductive layer; and
each pixel unit in the second pixel unit combination comprises a second pixel unit electrode arranged in the third conductive layer, and all pixel units in the second pixel unit combination share a second common electrode arranged in the second conductive layer.

6. The array substrate according to claim 5, wherein
a touch sensing chip is further arranged above the first substrate;
a first via hole and a second via hole are formed in and pass through the second insulating layer;
the plurality of touch leads comprise a first touch lead arranged in the second conductive layer and a second touch lead arranged in the third conductive layer;

each one of the first common electrodes is connected to the first touch lead through the first via hole and is configured to separately serve as a touch sensing electrode, and each of the second common electrodes is connected to the second touch lead through the second via hole and is configured to separately serve as a touch sensing electrode; and the first touch lead and the second touch lead each are connected to the touch sensing chip.

7. The array substrate according to claim 5, wherein the data lines are arranged in the first conductive layer, and each of the data lines is connected to source electrodes of a column of the pixel units;

a third via hole is formed in and passes through the first insulating layer, and a fourth via hole is formed in and passes through the first and second insulating layers;

in a pixel unit in the first pixel unit combination, the first pixel electrode is connected to a drain electrode of the pixel unit via the third via hole; and in a pixel unit in the second pixel unit combination, the second pixel electrode is connected to a drain electrode of the pixel unit via the fourth via hole.

8. The array substrate according to claim 7, wherein a plurality of the first common electrodes are connected to a plurality of the second common electrodes adjacent to the first common electrodes to form common electrode units; each of the common electrode units is configured to serve as a touch sensing electrode; and in each of the common electrode units, a first common electrode is connected to a second touch lead of a second common electrode adjacent to the first common electrode, or a second common electrode is connected to a first touch lead of a first common electrode adjacent to the second common electrode, to electrically connect the first common electrode and the second common electrode in the same common electrode unit.

9. The array substrate according to claim 5, wherein a place, at which the projections of the first and second common electrodes above the first substrate are adjacent to or overlap with each other, is above the data line.

10. The array substrate according to claim 5, wherein a touch sensing chip is further arranged above the first substrate, a fourth conductive layer insulated from the second and third conductive layers is arranged in the second insulating layer, and the plurality of touch leads comprise a plurality of third touch leads arranged in the fourth conductive layer;

a fifth via hole through which the second and fourth conductive layers are conducted are formed in the second insulating layer, and a sixth via hole through which the third and fourth conductive layers are conducted are formed in the second insulating layer;

a portion of the third touch leads are connected to the first common electrode through the fifth via hole, and a portion of the third touch leads are connected to the second common electrode through the sixth via hole; and the plurality of third touch leads each are connected to the touch sensing chip.

11. The array substrate according to claim 10, wherein each of the first common electrodes is configured to separately serve as a touch sensing electrode, and each of the second common electrodes is configured to separately serve as a touch sensing electrode.

12. The array substrate according to claim 10, wherein a plurality of the first common electrodes are connected to a plurality of the second common electrodes adjacent to the first common electrodes to form common electrode units; each of the common electrode units is configured to serve as a touch sensing electrode; and in each of the common electrode units, a first common electrode is electrically connected to a second common electrode adjacent to the first common electrode through the third touch lead.

13. The array substrate according to claim 4, wherein a metal bottom layer is further arranged between the first conductive layer and the first substrate, each of the plurality of pixel units comprises a gate electrode arranged in the metal bottom layer, and gate electrodes of each row of the pixel units are connected to a scan line arranged in the metal bottom layer.

14. The array substrate according to claim 1, wherein the first direction is perpendicular to the second direction.

15. The array substrate according to claim 1, wherein the first and second common electrodes are made of transparent metal oxide.

16. A display device, comprising:

an array substrate comprising:

a first substrate;

a pixel unit array arranged on the first substrate, wherein the pixel unit array comprises a plurality of pixel units arranged in an array;

a plurality of scan lines arranged in a first direction and a plurality of data lines arranged in a second direction, wherein the plurality of scan lines and the plurality of data lines are configured to drive the pixel units;

a plurality of first common electrodes and a plurality of second common electrodes, wherein the plurality of first and second common electrodes are configured to serve as common electrodes in a display phase and serve as touch sensing electrodes in a touch sensing phase; and a plurality of touch leads, wherein the first common electrodes are arranged in a different film layer from the second common electrodes and the first and second common electrodes are connected to the plurality of touch leads;

projections of the first and second common electrodes on the first substrate are arranged alternately in the first direction, and projections of the first and second common electrodes on the first substrate are arranged adjacent to or overlap with each other in the first direction; or the plurality of the first common electrodes are arranged in turn in the first direction to form first common electrode groups, the plurality of the second common electrodes are arranged in turn in the first direction to form second common electrode groups, projections of the first and second common electrode groups on the first substrate are arranged alternately in the first direction, and a projection of a first common electrode on the first substrate is adjacent to or overlaps with a projection of a second common electrode adjacent to the first common electrode on the first substrate in the first direction; and a cover plate arranged opposite to the array substrate.

17. The display device according to claim 16, wherein the cover plate is a color filter, and the display device further comprises: a liquid crystal layer arranged between the array substrate and the color filter, and a touch sensing chip arranged on the array substrate.

* * * * *